(12) United States Patent
Choi et al.

(10) Patent No.: US 12,104,861 B2
(45) Date of Patent: Oct. 1, 2024

(54) HEAT EXCHANGER

(71) Applicant: LG ELECTRONICS INC., Seoul (KR)

(72) Inventors: Jiwon Choi, Seoul (KR); Sukyoung Lee, Seoul (KR); Hanchoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/621,450

(22) PCT Filed: Jul. 9, 2020

(86) PCT No.: PCT/KR2020/008987
§ 371 (c)(1),
(2) Date: Dec. 21, 2021

(87) PCT Pub. No.: WO2021/015456
PCT Pub. Date: Jan. 28, 2021

(65) Prior Publication Data
US 2022/0349658 A1 Nov. 3, 2022

(30) Foreign Application Priority Data
Jul. 25, 2019 (KR) .................. 10-2019-0090541

(51) Int. Cl.
*F28D 7/16* (2006.01)
*F28D 7/12* (2006.01)
*F28F 9/22* (2006.01)

(52) U.S. Cl.
CPC ............. *F28D 7/1607* (2013.01); *F28D 7/12* (2013.01); *F28F 9/22* (2013.01); *F28F 2009/226* (2013.01)

(58) Field of Classification Search
CPC ........ F28D 9/22; F28D 9/24; F28D 2009/226; F28D 7/1607
See application file for complete search history.

(56) References Cited

U.S. PATENT DOCUMENTS 4,621,677 A * 11/1986 Suzuki .................. F28F 9/22
165/145
4,834,173 A 5/1989 Weiss et al.
(Continued)

FOREIGN PATENT DOCUMENTS

DE 2410292 9/1975
EP 0117820 9/1984
(Continued)

OTHER PUBLICATIONS

European Search Report issued in application No. 20843243.5 dated Jul. 3, 2023.
(Continued)

*Primary Examiner* — Eric S Ruppert
(74) *Attorney, Agent, or Firm* — KED & ASSOCIATES, LLP

(57) ABSTRACT

A heat exchanger according to an embodiment of the present disclosure includes a housing, a gas inflow pipe configured to flow exhaust gas in the housing and a gas exhaust pipe configured to discharge the exhaust gas to the outside of the housing, a cooling water inflow pipe configured to flow cooling water in the housing and a cooling water outflow pipe configured to flow out the cooling water heat-exchanged with the exhaust gas to the outside of the housing, a plurality of tubes extending in the housing in the longitudinal direction of the housing and through which the cooling water flowing therein through the cooling water inflow pipe flows, and a plurality of baffles which are installed in the housing to insert the plurality of tubes thereinto and which are spaced apart from each other by a
(Continued)

predetermined distance and are disposed, in which the baffle may be a first curved part configured to extend to be rounded with a first curvature, a first straight part configured to extend linearly from one end part of the first curved part, a second straight part configured to extend linearly from the other end part of the first curved part, and a second curved part positioned between the first and second straight parts and configured to extend to be rounded with a second curvature, and the first straight part and the second straight part may be formed in a direction crossing each other.

15 Claims, 9 Drawing Sheets

(56) References Cited

U.S. PATENT DOCUMENTS

| | | | |
|---|---|---|---|
| 5,915,472 A | 6/1999 | Takikawa et al. | |
| 6,039,113 A * | 3/2000 | Crewdson | F28F 9/22 |
| | | | 422/201 |
| 2016/0076817 A1 | 3/2016 | Jeffery et al. | |

FOREIGN PATENT DOCUMENTS

| | | |
|---|---|---|
| FR | 2623606 | 5/1989 |
| GB | 2313438 | 11/1997 |
| JP | S60-117485 | 8/1985 |
| JP | H03-144294 | 6/1991 |
| JP | H09-053891 | 2/1997 |
| KR | 10-1637981 | 7/2016 |
| KR | 10-1793752 | 11/2017 |
| KR | 10-2018-0009622 | 1/2018 |
| WO | WO 2011/061090 | 5/2011 |

OTHER PUBLICATIONS

International Search Report (with English Translation) and Written Opinion dated Oct. 13, 2020 issued in PCT Application No. PCT/KR2020/008987.

Korean Office Action dated Mar. 22, 2024 issued in Application No. 10-2019-0090541.

* cited by examiner (a)

| TUBE DIAMETER | BAFFLE NUMBER | TUBE NUMBER | BAFFLE CUT LENGTH | HEAT AMOUNT | HEAT AMOUNT RATIO | EXHAUST GAS PRESSURE LOSS | EXHAUST GAS PRESSURE LOSS RATIO |
|---|---|---|---|---|---|---|---|
| [mm] | [PIECE] | [PIECE] | [mm] | [W] | [%] | [Pa] | [%] |
| 15 | 7 | 13 | 0 | 6626.9 | 100.0 | 4870.5 | 100.0 |
| 15 | 7 | 13 | 9 | 6562.6 | 99.0 | 3605.5 | 74.0 |

HEAT EXCHANGER

CROSS-REFERENCE TO RELATED PATENT APPLICATIONS

This application is a U.S. National Stage Application under 35 U.S.C. § 371 of PCT Application No. PCT/KR2020/008987, filed Jul. 9, 2020, which claims priority to Korean Patent Application No. 10-2019-0090541, filed Jul. 25, 2019, whose entire disclosures are hereby incorporated by reference.

TECHNICAL FIELD

The present disclosure relates to a heat exchanger.

BACKGROUND ART

The heat pump system is a system provided with a refrigeration cycle capable of performing a cooling or heating operation and may be interlocked with a hot water supply device or a heating/cooling device. In other words, hot water may be produced using a heat source obtained by exchanging heat between the refrigerant of the refrigeration cycle and a predetermined heat storage medium or may perform air conditioning for cooling and heating.

The refrigerating cycle includes a compressor for compressing the refrigerant, a condenser for condensing the refrigerant compressed in the compressor, an expansion device for decompressing the refrigerant condensed in the condenser, and an evaporator for evaporating the decompressed refrigerant.

The heat pump system includes a gas heat pump system (GHP). A large-capacity compressor is required for air conditioning for industrial use or for large buildings, not for home use. In other words, a gas heat pump system may be used as a system using a gas engine instead of an electric motor to drive a compressor for compressing a large amount of refrigerant into high-temperature and high-pressure gas.

The gas heat pump system includes an engine that generates power using a mixture of fuel and air (hereinafter, mixed fuel) and a cooling water that cools the engine while circulating the engine. The cooling water may absorb waste heat of the engine, and the absorbed waste heat may be supplied to a refrigerant circulating in the gas heat pump system to help improve system performance. In particular, when the heating operation is performed because the outside temperature is low, the evaporation performance of the refrigeration cycle may be improved.

In order to absorb the waste heat of the engine, the gas heat pump system includes an exhaust gas heat exchanger which is provided at the outlet side of the engine and into which exhaust gas generated after the mixed fuel is burned flows. As heat exchange is performed between the cooling water and the exhaust gas in the exhaust gas heat exchanger, waste heat of the engine may be recovered.

In other words, in the gas heat pump system, heat energy that is not converted into mechanical kinetic energy among energy generated during combustion of the mixed fuel may be prevented from being wasted to the outside, thereby increasing heat exchange efficiency.

However, since the exhaust gas heat exchanger must be installed in a limited space when the gas heat pump system is installed, there is a problem that it is difficult to change the volume, height, or the like.

In order to improve the flow of cooling water and exhaust gas flowing inside the exhaust gas heat exchanger installed in the limited space, in Korean Patent No. 10-1793752, a heat exchanger for exhaust gas including a plurality of baffles is disclosed.

However, in the heat exchanger for exhaust gas, there is a problem that a pressure loss occurs in an internal flow path while the exhaust gas passing through the baffle flows through the inside of the heat exchanger.

In addition, there is a problem that the flow path of the exhaust gas passing through the baffle still does not sufficiently exchange heat with the cooling water.

DISCLOSURE

Technical Problem

The present embodiment provides a heat exchanger which is located inside the heat exchanger and increases the flow area of exhaust gas by cutting a part of the baffle into which the tube through which the cooling water flows is inserted.

In detail, the present embodiment provides a heat exchanger in which the baffle is provided with a plurality of straight parts between the rounded curved parts so that heat exchange is possible while the exhaust gas passes through at least one of the plurality of straight parts, and thus it is easy to secure a flow area of the exhaust gas.

In addition, the present embodiment provides a heat exchanger in which a pressure loss of exhaust gas flowing through the inside of the heat exchanger is reduced due to the shape of the baffle.

In addition, the present embodiment provides a heat exchanger in which, in the plurality of baffles, the positions of the straight parts of the plurality of adjacent baffles are disposed to be different from each other, and thus the flow distance of the exhaust gas increases to increase heat exchange efficiency.

In addition, the present embodiment provides a heat exchanger in which heat exchange performance can increase with the same number of baffles due to the shape of the baffle, thereby reducing the manufacturing cost of the heat exchanger.

Technical Solution

An embodiment of the present disclosure includes a plurality of tubes and a baffle into which the tube are inserted in the housing, and the baffle has a rounded curved part and a linear straight part, so that the flow area of the exhaust gas flowing in the heat exchanger may increase.

In addition, in the embodiment of the present disclosure, a plurality of straight parts of the baffles are formed and the positions of the straight parts of the consecutively arranged baffles are disposed to be different from each other, so that the flow distance of the exhaust gas may increase to increase heat exchange performance.

In addition, according to the embodiment of the present disclosure, the pressure loss generated while the exhaust gas flows through the inside of the heat exchanger may be reduced by the shape of the baffle.

A heat exchanger according to an embodiment of the present disclosure includes a housing, a gas inflow pipe configured to flow exhaust gas in the housing and a gas exhaust pipe configured to discharge the exhaust gas to the outside of the housing, a cooling water inflow pipe configured to flow cooling water in the housing and a cooling water outflow pipe configured to flow out the cooling water heat-exchanged with the exhaust gas to the outside of the housing, a plurality of tubes extending in the housing in the longitudinal direction of the housing and through which the cooling water flowing therein through the cooling water inflow pipe flows, and a plurality of baffles which are installed in the housing to insert the plurality of tubes thereinto and which are spaced apart from each other by a predetermined distance and are disposed, in which the baffle may be a first curved part configured to extend to be rounded with a first curvature, a first straight part configured to extend linearly from one end part of the first curved part, a second straight part configured to extend linearly from the other end part of the first curved part, and a second curved part positioned between the first and second straight parts and configured to extend to be rounded with a second curvature, and the first straight part and the second straight part may be formed in a direction crossing each other.

The first curvature and the second curvature may be the same.

The plurality of baffles may be disposed to be spaced apart from each other in the extension direction of the tube, the plurality of baffles may include a first baffle and a second baffle spaced apart from the first baffle, and the first straight part and the second straight part of the first baffle may overlap the first curved part of the second baffle in an extension direction of the tube.

In the plurality of baffles, the first baffle and the second baffle may be alternately arranged.

The first straight part and the second straight part of the second baffle may overlap the first curved part of the first baffle adjacent to the second baffle in an extension direction of the tube.

A plurality of baffle insertion holes into which the plurality of tubes are inserted may be formed in the baffle.

The length of the first straight part may be longer than the length of the second straight part, the plurality of baffle insertion holes may be parallel to the first straight part and may be arranged to form a plurality of rows, and the number of baffle insertion holes adjacent to the first straight part may be greater than the number of baffle insertion holes adjacent to the second straight part.

The plurality of baffle insertion holes may include a first baffle insertion hole forming a first row and disposed furthest from the first straight part, a second baffle insertion hole forming a second row, and a third baffle insertion hole forming a third row and disposed closest to the first straight part.

A distance between a second baffle insertion hole of the second baffle insertion holes, which is located closest to the first curved part and the first curved part may be formed to be longer than a distance between a second baffle insertion hole of the second baffle insertion holes, which is located closest to the second straight part and the second straight part.

The number of the first baffle insertion holes may be the same as the number of the third baffle insertion holes.

The first baffle insertion hole of the first baffle may be aligned with the third baffle insertion hole of the second baffle, and the third baffle insertion hole of the first baffle may be aligned with the first baffle insertion hole of the second baffle.

The housing may include a first housing and a second housing located in the first housing and in which the tube and the baffle are installed, the cooling water inflow pipe and the gas discharge pipe may be connected to the first housing, the gas inflow pipe may be formed through the first housing and connected to the second housing, and a first space through which the cooling water flows may be formed between the first housing and the second housing.

The length of the housing may be the distance from the front end part to the rear end part of both end parts of the housing, the gas inflow pipe may be located closer to the front end part of both end parts of the first and second housings, the gas inflow pipe may be located closer to the rear end part of both end parts of the first and second housings, and the gas inflow pipe may be positioned close to the first straight part of the first baffle.

The first and second housings may have cylindrical shapes with both sides open and may further include a pair of headers coupled to both sides of the second housing and having a plurality of header insertion holes into which the plurality of tubes are inserted, and a pair of covers disposed on the outside of the pair of headers coupled to both sides of the first housing, and a cover space communicating with the tube and the first space may be formed in a cover located at the rear of the pair of covers.

The extension direction of the tube is a direction from the front to the rear, and the baffle insertion hole may be aligned with the header insertion hole in the rear direction.

The cooling water flowing in through the cooling water inflow pipe may flow through the first space and thus the direction thereof may be changed in the cover space and flows into the plurality of tubes, and the exhaust gas flowing in through the gas inflow pipe may flow from the front to the rear in the inner space of the second housing.

Advantageous Effect

According to the heat exchanger according to the embodiment of the present disclosure, a part of the baffle into which the tube through which the cooling water flows is inserted is cut, thereby increasing the flow area of the exhaust gas exchanging heat with the cooling water.

In detail, since the baffle is provided with a plurality of linear straight parts positioned between the rounded curved parts, the exhaust gas may pass through at least one of the plurality of straight parts and exchange heat with the cooling water, so that the flow area of the exhaust gas can be easily obtained.

In addition, due to the shape of the baffle, it is possible to reduce a pressure loss occurring while the exhaust gas flows through the inside of the heat exchanger.

In addition, since the plurality of baffles are provided and the positions of the straight parts of the plurality of baffles are different from each other, the flow distance of the exhaust gas increases, so that heat exchange efficiency can increase.

In addition, due to the shape of the baffle, heat exchange performance can be increased with the same number of baffles, thereby reducing the manufacturing cost of the heat exchanger, thereby providing an economical effect.

DESCRIPTION OF DRAWINGS

FIG. 7 is a table illustrating comparison results regarding the control group baffle and the baffle of the present disclosure.

BEST MODE

Figure 1:
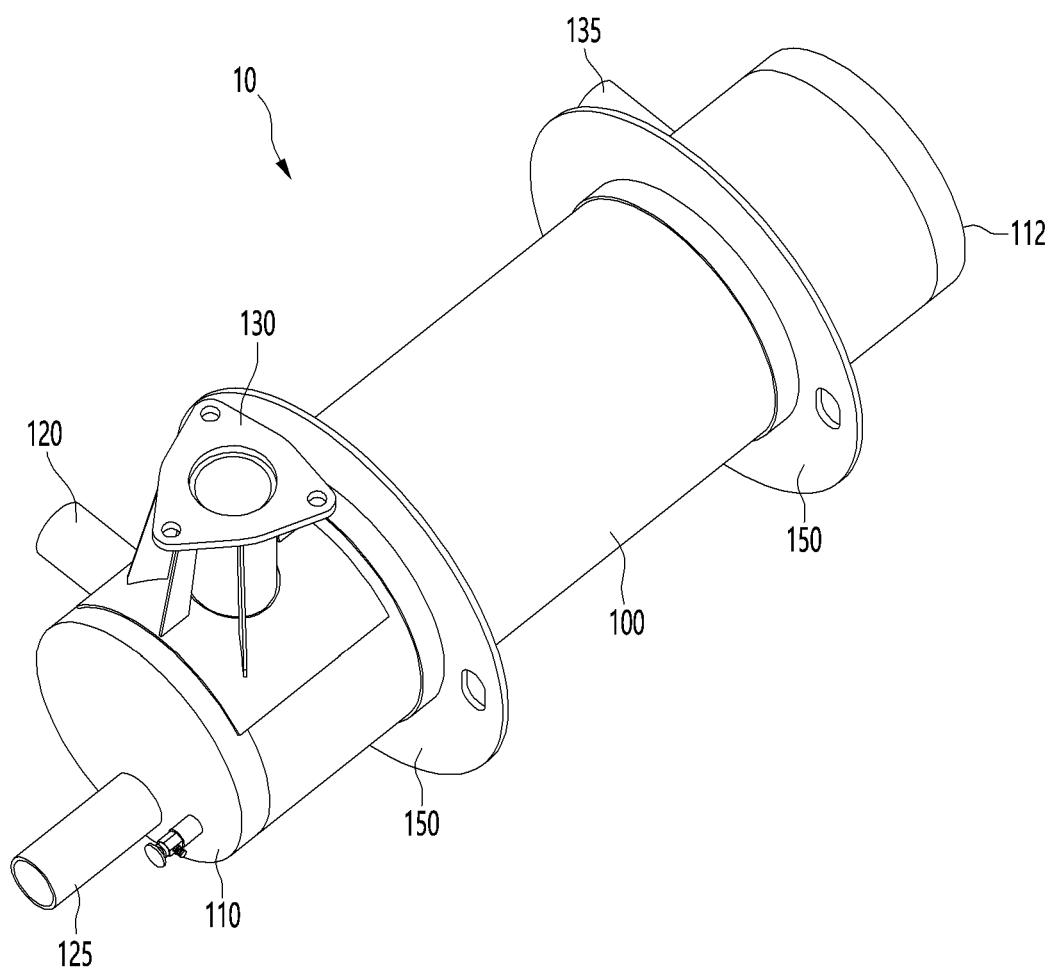
FIG. 1 is a perspective view illustrating a heat exchanger according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
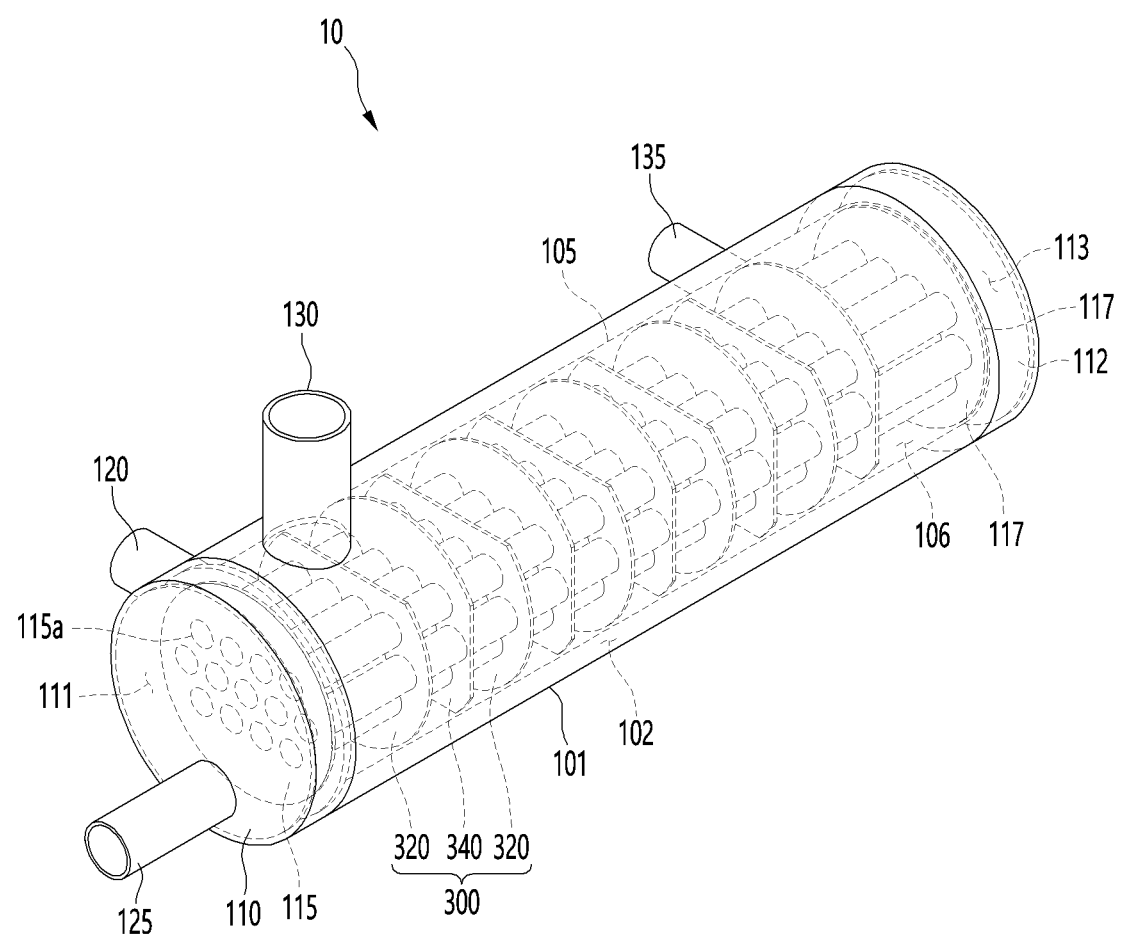
FIG. 2 is an internal transparent view illustrating the heat exchanger.
Figure 3:
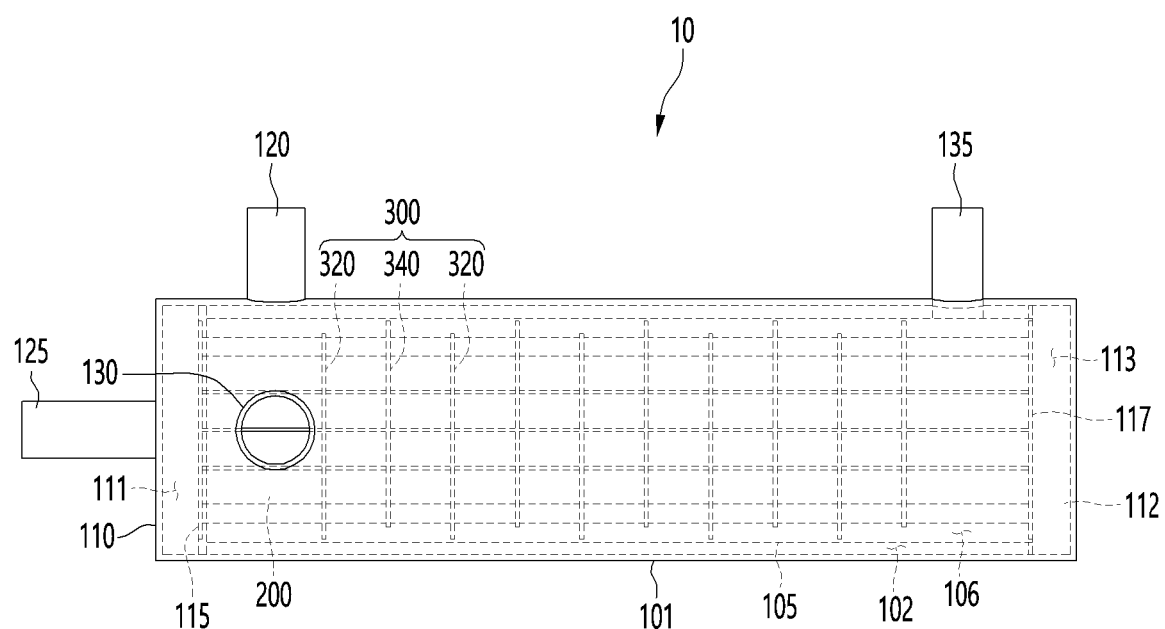
FIG. 3 is an internal transparent view illustrating the heat exchanger as viewed from above.

FIG. 1 is a perspective view illustrating a heat exchanger according to an embodiment of the present disclosure, FIG. 2 is an internal transparent view illustrating the heat exchanger, and FIG. 3 is an internal transparent view illustrating the heat exchanger as viewed from above.

Referring to FIGS. 1 to 3, the heat exchanger 10 according to an embodiment of the present disclosure may include a cylindrical housing 100, cooling water pipes 120 and 125 through which the cooling water flows in or flows out, and gas pipes 130 and 135 through which gas performing heat exchange with the cooling water flows in or discharged.

The heat exchanger 10 may be an exhaust gas heat exchanger for recovering waste heat of exhaust gas generated when the engine is driven in a gas heat pump system (GHP).

Specifically, when an engine that generates energy by burning a mixture of fuel and air (hereinafter, referred to as mixed fuel) is driven, exhaust gas is generated during the combustion of the mixed fuel. By heat-exchanging the exhaust gas with the cooling water of the gas heat pump system, waste heat of the exhaust gas can be recovered through the cooling water without discharging to the outside, so that the heat exchange efficiency of the gas heat pump system can increase.

The housing 100 may have a cylindrical shape with both sides open.

The housing 100 may include a first housing 101 positioned outside and a second housing 105 positioned inside the first housing 101. By providing the first and second housings 101 and 105, flow paths of the cooling water and the exhaust gas may be separated.

The first housing 101 and the second housing 105 may have a cylindrical shape with both sides open. A diameter of the first housing 101 may be larger than a diameter of the second housing 105.

The inner surface of the first housing 101 and the outer surface of the second housing 105 may be spaced apart from each other. In other words, a first space 102 through which the cooling water flows may be formed between the first housing 101 and the second housing 105.

A second space 106 through which the exhaust gas flows may be formed inside the second housing 105.

Here, the first housing 101 can be defined as an "outer case", the second housing 105 can be defined as an "inner case", the first space 102 can be defined as a "cooling water flow path", and the second space 106 can be defined as "an exhaust gas flow path".

The heat exchanger 10 may further include a pair of headers 115 and 117 which are disposed at both ends of the second housing 105 and into which a tube 200 to be described later is inserted, and a pair of covers 110, 112 which are disposed outside the pair of headers 115 and 117 and which shields the inside the housing 100.

The pair of headers 115 and 117 may be provided as a circular plate to correspond to the cross-sectional shape of the second housing 105.

The pair of headers 115 and 117 may be installed in openings on the both sides of the second housing 105. For example, the pair of headers 115 and 117 may have the same diameter as that of the second housing 105.

A plurality of header insertion holes 115a and 117a into which the tube 200 is inserted may be formed in the pair of headers 115 and 117. One end or the other end of the plurality of tubes 200 may be inserted into the plurality of header insertion holes 115a and 117a.

The disposition of the plurality of header insertion holes 115a and 117a may be the same as that of the baffle insertion hole 310 of the baffle 300 to be described later. By the same disposition of the header insertion holes 115a and 117a and the baffle insertion hole 310, the tube 200 can be easily inserted thereinto.

The pair of headers 115 and 117 may include one header 115 disposed close to a cooling water outflow pipe 125, which will be described later, and another header 117 disposed in a direction opposite to the one header 115.

The pair of covers 110 and 112 may have a cylindrical shape in which at least a part of one side is opened. The pair of covers 110 and 112 may be installed at both ends of the housing 100 so that one opened side faces the first space 102 and the second space 106.

In detail, the pair of covers 110 and 112 may be installed at both ends of the first housing 101.

The pair of covers 110 and 112 may have the same diameter as that of the first housing 101.

An opening on one side of the pair of covers 110 and 112 may be disposed to face the opening of the pair of headers 115 and 117 and the first housing 101.

The pair of covers 110 and 112 may include a cover 110 on which the cooling water outflow pipe 125 is installed and which is positioned adjacent to the one header 115, another cover 112 which is installed in a direction opposite to the one cover 110 and positioned adjacent to the other header 117.

Here, a direction in which the one cover 110 and one header 115 are positioned may be defined as a "front", and a direction in which the other cover 112 and the other header 117 are positioned may be defined as a "rear".

When the pair of covers 110 and 112 are installed at both ends of the first housing 101, the first cover space 111 and the second cover space 113 through which the cooling water flows inside the one cover 110 and the other cover 112 may be formed.

An opening on one side of the one cover 110 may be formed to have the same size as the opening of the second housing 105 or the one header 115. In other words, a part of one side of the one cover 110 shields the opening of the first housing 101 except for the opening of the second housing 105, and an opening as another part of one side of the one cover 110 may be connected to the second housing 105 or the one header 115.

The first cover space 111 of the one cover 110 may communicate with the inside of the tube 200 through the header insertion hole 115a of the one header 115.

However, the first cover space 111 may be prevented from communicating with the first space 102 by a part of one side of the one cover 110 that is not opened.

Accordingly, the cooling water flowing into the first space 102 through the cooling water inflow pipe 120 to be described later does not flow into the first cover space 111 but can flow backward.

The opening on one side of the other cover 112 may be formed to have the same size as the opening of the first housing 101.

The second cover space 113 of the other cover 112 may integrally opened and communicated with the first space 102 without being divided, by an opening on one side of the other cover 112.

In addition, the second cover space 113 of the other cover 112 may be integrally opened and communicated with the interior of the plurality of tubes 200 through the header insertion hole 117a of the other header 117.

The cooling water pipes 120 and 125 may include a cooling water inflow pipe 120 in which cooling water used for a refrigeration cycle of the gas heat pump system flows, and a cooling water outflow pipe 125 through which the cooling water is discharged after heat exchange with the exhaust gas.

The cooling water inflow pipe 120 may be formed in the housing 100. In detail, the cooling water inflow pipe 120 may be formed on the outer surface of the first housing 101.

The cooling water inflow pipe 120 may be located closer to the front end part of both end parts of the first housing 101 on the outer surface of the first housing 101. The cooling water flowing in through the cooling water inflow pipe 120 may flow through the first space 102 of the first housing 101 toward the rear.

At this time, the cooling water may be prevented from flowing into the first cover space 111 by the one cover 110.

The cooling water inflow pipe 120 may be located on the outer surface of the first housing 101 adjacent to the cooling water outflow pipe 125.

The cooling water outflow pipe 125 may be formed in front of the housing 100 adjacent to the cooling water inflow pipe 120.

In detail, the cooling water outflow pipe 125 may be formed on the one cover 110. For example, the cooling water outflow pipe 125 may be connected to the other side surface of the cover 110 in a direction opposite to the opening on one side. In other words, the cooling water flowing through the first cover space 111 of the one cover 110 may flow out of the heat exchanger 10 through the cooling water outflow pipe 125.

In addition, the cooling water inflow pipe 120 and the cooling water outflow pipe 125 may be positioned in a direction crossing each other. For example, the cooling water inflow pipe 120 and the cooling water outflow pipe 125 may be positioned to be perpendicular to each other.

Due to the positions of the cooling water inflow pipe 120 and the cooling water outflow pipe 125, the cooling water flowing into the cooling water inflow pipe 120 flows toward the other cover 112, and then the flow direction is changed to flow toward the one cover 10 and thus may flow out into the cooling water outflow pipe 125.

Since the flow path of the cooling water is lengthened by the positions of the cooling water inflow pipe 120 and the cooling water outflow pipe 125, the heat exchange time between the cooling water and the exhaust gas may increase.

Here, a direction from the one cover 110 to the other cover 112 may be defined as a "first direction". In other words, the first direction may be understood as an extension direction of the tube, a direction from the front to the rear, or a direction away from the cooling water outflow pipe 125.

The gas pipes 130 and 135 may include a gas inflow pipe 130 in which exhaust gas generated from the engine flows, and a gas discharge pipe 135 through which the exhaust gas exchanges heat with the cooling water and is discharged.

The gas inflow pipe 130 and the gas discharge pipe 135 may be formed in the housing 100. In detail, the gas inflow pipe 130 and the gas discharge pipe 135 may pass through the first housing 101 to be installed in the second housing 105.

In other words, the exhaust gas may flow into the second space 106 through the gas inflow pipe 130 and may be discharged to the outside of the heat exchanger 10 through the gas discharge pipe 135.

Accordingly, by the installation structure of the gas inflow pipe 130 and the gas discharge pipe 135, it is possible to prevent the exhaust gas from being mixed with the cooling water flowing through the first space 102.

The gas inflow pipe 130 may be located closer to the front end part of both end parts of the housing 100. In other words, the gas inflow pipe 130 may be formed in a position close to the cooling water inflow pipe 120.

For example, the gas inflow pipe 130 may be located on the same circumference as the cooling water inflow pipe 120.

The gas inflow pipe 130 may be positioned in a direction crossing the cooling water inflow pipe 120. For example, the gas inflow pipe 130 and the cooling water inflow pipe 120 may be formed perpendicular to each other.

In other words, the cooling water inflow pipe 120, the cooling water outflow pipe 125, and the gas inflow pipe 130 may be positioned to be perpendicular to each other.

The gas inflow pipe 130 may be located above the housing 100 with reference to FIG. 2. However, the position of the gas inflow pipe 130 is not limited thereto.

The gas discharge pipe 135 may be located closer to a rear end part of both end parts of the housing 100. In other words, the gas discharge pipe 135 may be located a position adjacent to the other cover 112.

The gas discharge pipe 135 may be positioned in a direction opposite to the cooling water inflow pipe 120 and the gas inflow pipe 130.

The gas discharge pipe 135 may be positioned parallel to the cooling water inflow pipe 120. In other words, the gas discharge pipe 135 may be formed in a direction crossing the gas inflow pipe 130.

For example, the gas discharge pipe 135 and the gas inflow pipe 130 may be formed perpendicular to each other.

In other words, the gas inflow pipe 130, the gas discharge pipe 135, and the cooling water outflow pipe 125 may be positioned to be perpendicular to each other.

The heat exchanger 10 may further include a supporter 150 mounted on the outer surface of the first housing 101. The supporter 150 may be formed in a ring shape.

The heat exchanger 10 is supported by the supporter 150, and the heat exchanger 10 may be easily installed by a fastening part formed in the supporter 150.

The heat exchanger 10 is installed inside the second housing 105, extends in the longitudinal direction of the second housing 105, and may include a plurality of tubes 200 through which the cooling water flows and a baffle 300 which is installed in the second housing 105 and into which the plurality of tubes 200 are inserted.

Here, the longitudinal direction of the second housing 105 is the longitudinal direction of the housing 100 and may be understood as the first direction. The length of the housing 100 may be defined as a distance from a front end part to a rear end part among both end parts of the housing 100.

In other words, it may be understood that the tube 200 extends from the front to the rear.

As an example, the plurality of tubes 200 may be provided in thirteen but is not limited thereto.

A plurality of the baffles 300 may be provided and serve to support the plurality of tubes 200 inserted into the baffle 300.

The plurality of baffles 300 may be disposed to be spaced apart from each other by a predetermined distance from the front to the rear.

The plurality of baffles 300 may be disposed between the pair of headers 115 and 117. In other words, both ends of the plurality of tubes 200 may be supported by the pair of headers 115 and 117, and parts other than both ends of the plurality of tubes 200 may be supported by the baffle 300.

A distance between the headers 115 and 117 and the baffle 300 adjacent to the headers 115 and 117 among the plurality of baffles 300 may be longer than a distance between the plurality of baffles 300. Since the gas inflow pipe 130 and the gas discharge pipe 135 may be positioned between the baffle 300 and the headers 115 and 117, the exhaust gas may easily flows therein or be discharged.

The baffle 300 may have a shape in which a part of a circle is cut.

Alternatively, the baffle 300 may be formed to include a rounded portion and a linear portion. In other words, the exhaust gas may flow through the cut or linear portion of the baffle 300.

The baffle 300 may be installed on the inner surface of the second housing 105 by a fastening member (not illustrated).

Alternatively, the baffle 300 may be installed in contact with the inner surface of the second housing 105.

Due to the structure of the baffle 300, the baffle 300 may block a part of the cross-section of the second housing 105.

Figure 4:
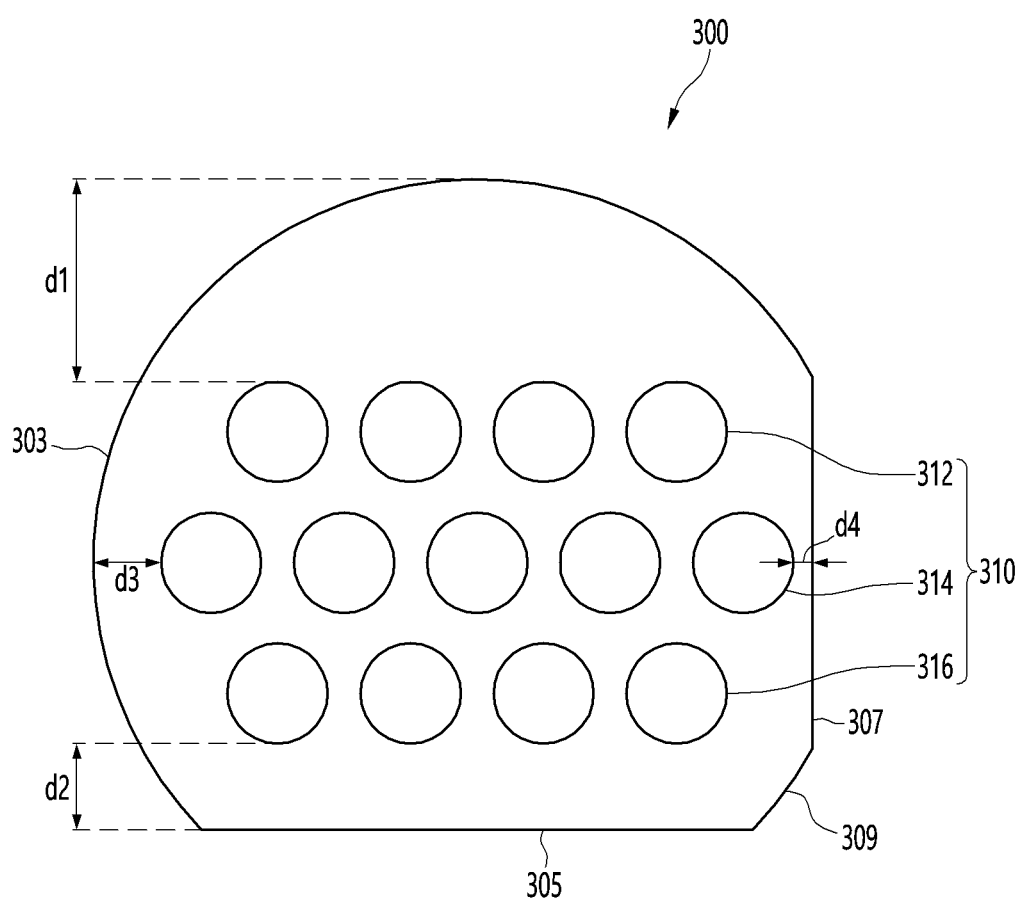
FIG. 4 is a front view illustrating a baffle disposed inside a heat exchanger according to an embodiment of the present disclosure.
Figure 5:
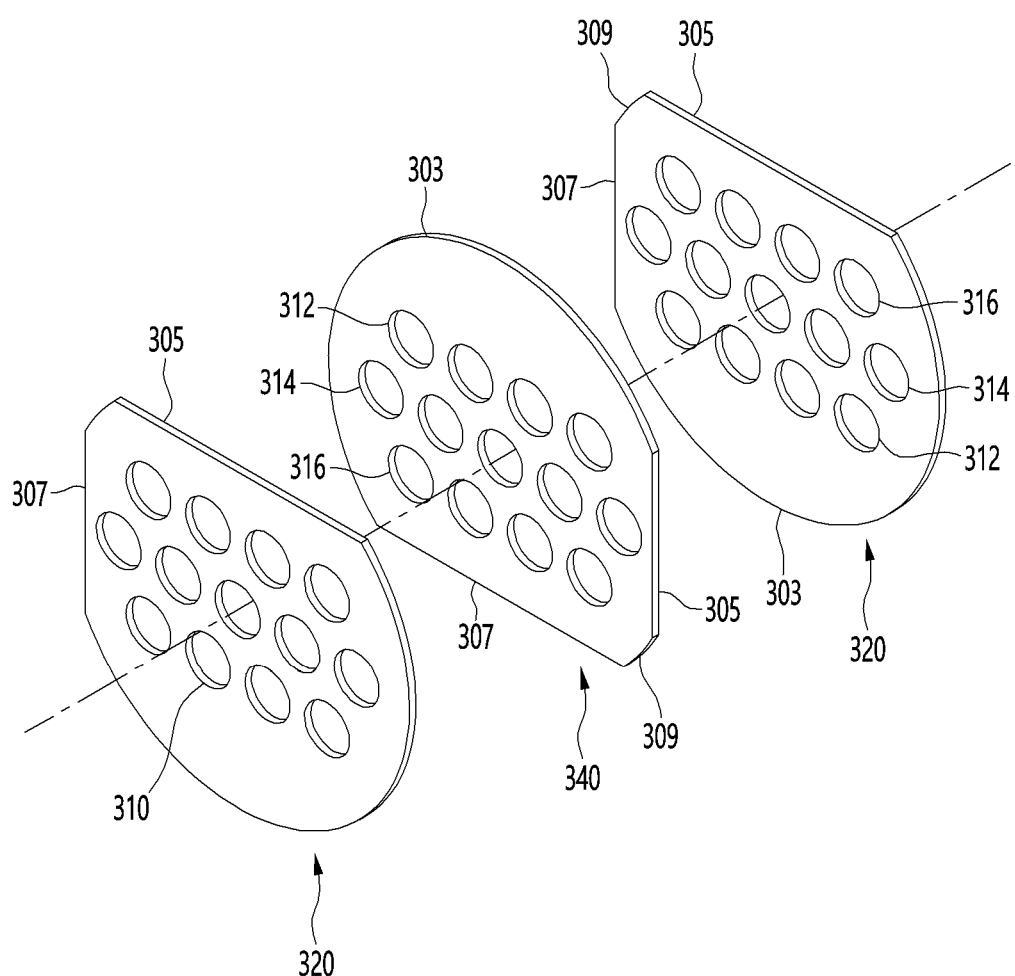
FIG. 5 is a perspective view illustrating three baffles sequentially arranged inside the heat exchanger.

FIG. 4 is a front view illustrating a baffle disposed inside a heat exchanger according to an embodiment of the present disclosure, and FIG. 5 is a perspective view illustrating three baffles sequentially arranged inside the heat exchanger.

Referring to FIGS. 4 and 5, in the baffle 300, a baffle insertion hole 310 may be formed to insert the plurality of tubes 200.

The baffle insertion hole 310 may be formed to correspond to the number of the plurality of tubes 200. For example, the number of baffle insertion holes 310 may be 13.

Hereinafter, a case in which the baffle insertion hole 310 is 13 will be described. However, the number of the baffle insertion holes 310 is not limited thereto.

The position of the baffle insertion hole 310 may be formed to correspond to the position of the header insertion hole 115a and 117a. The baffle insertion hole 310 and the header insertion hole 115a and 117a may be aligned in the first direction, that is, in a direction from the front to the rear.

The baffle insertion hole 310 is parallel to the first straight part 305 to be described later and may be disposed to form a plurality of rows.

The number of baffle insertion holes adjacent to the first straight part 305 may be greater than the number of baffle insertion holes adjacent to the second straight part 307.

In detail, the baffle insertion hole 310 may include a first baffle insertion hole 312 positioned at the uppermost side with reference to FIG. 4, and a second baffle insertion hole 314 positioned below the first baffle insertion hole 312, and a third baffle insertion hole 316 positioned below the second baffle insertion hole 314.

The second baffle insertion hole 314 may be positioned between the first baffle insertion hole 312 and the third baffle insertion hole 316.

The first baffle insertion hole 312 and the third baffle insertion hole 316 may be provided in the same number. For example, the number of the first baffle insertion hole 312 may be 4, the number of the second baffle insertion hole 314 may be 5, and the number of the third baffle insertion hole 316 may be 4.

The first to third baffle insertion holes 312, 314, and 316 may be disposed to be spaced apart from each other by a predetermined distance.

The first baffle insertion hole 312 and the second baffle insertion hole 314 and the second baffle insertion hole 314 and the third baffle insertion hole 316 may be disposed to be spaced apart from each other by a predetermined distance.

The distance between the first baffle insertion hole 312 and the second baffle insertion hole 314 may be the same as the distance between the second baffle insertion hole 314 and the third baffle insertion hole 316.

The second baffle insertion hole 314 excluding the second baffle insertion hole 314 located on both sides of the second baffle insertion holes 314 may be located below or above the distance of the first baffle insertion hole 312 or the third baffle insertion hole 316, which is adjacent to the second baffle insertion hole 314.

However, the vertical disposition of the first, second, and third baffle insertion holes 314 may vary according to the disposition of the baffle 300.

The plurality of baffles 300 may be disposed to be spaced apart from each other by a predetermined distance in the first direction. The exhaust gas may flow between the plurality of baffles 300.

The baffle 300 may include curved parts 303 and 309 extending roundly and straight parts 305 and 307 extending linearly.

The curved parts 303 and 309 may include a first curved part 303 that extends roundly with a first curvature and a second curved part 309 that extends roundly with a second curvature.

A length of the first curved part 303 may be longer than a length of the second curved part 309. For example, the first curved part 303 may correspond to approximately half of the baffle 300.

The first curvature and the second curvature may be the same. In other words, the first curved part 303 and the second curved part 309 may be understood as non-cut portions when a part of the circular shape is cut.

The first curved part 303 may form upper and left sides of the baffle 300 with reference to FIG. 4.

For example, the first curved part 303 may surround a second baffle insertion hole 314 located at the leftmost of the first baffle insertion hole 312 and the second baffle insertion hole 314 and a third baffle insertion hole 316 located at the leftmost of the second baffle insertion hole 314 and the third baffle insertion holes 316 may be surrounded, with reference to FIG. 4.

The second curved part 309 may have a length surrounding the third baffle insertion hole 316 located at the rightmost side among the third baffle insertion holes 316 with reference to FIG. 4.

The first curved part 303 and the second curved part 309 may be disposed to face each other.

The baffle 300 may have a plurality of linear parts.

In detail, the straight parts 305 and 307 may include a first straight part 305 extending linearly and a second straight part 307 disposed in a direction crossing the first straight part 305 and extending linearly.

The first straight part 305 and the second straight part 307 may extend from the first curved part 303, respectively. In other words, the first straight part 305 may extend linearly from one end part of the first curved part 303, and the second straight part 307 may extend linearly from the other end part of the first curved part 303.

The second curved part 309 may be positioned between the first straight part 305 and the second straight part 307.

A length of the first straight part 305 may be longer than a length of the second straight part 307.

For example, the first straight part 305 may have a length corresponding to the four third baffle insertion holes 316 with reference to FIG. 4, and the second straight part 307 may have a length corresponding to the first, second, and third baffle insertion holes 312, 314, and 316 which are positioned at the rightmost side among the first, second, and third baffle insertion holes 312, 314, and 316.

The first and second straight parts 305 and 307 of the baffle 300 may be spaced apart from the inner surface of the second housing 105. In other words, a separation space may be formed between the first and second straight parts 305 and 307 and the inner surface of the second housing 105.

The exhaust gas flowing through the second space 106 may pass one or more of the spaces between the first straight part 305 and the second straight part 307 of the baffle 300 and the inner surface of the second housing 105.

A distance d1 between a first imaginary line in contact with the upper side of the first baffle insertion hole 312 and a second imaginary line parallel to the first imaginary line and in contact with the first curved part 303 can be defined as a first distance d1.

A distance d3 between a third imaginary line perpendicular to the first imaginary line while being in contact with the left side of the second baffle inserting hole 314 positioned on the leftmost side with reference to FIG. 4 among the second baffle inserting holes 314 and a fourth imaginary line parallel to the third imaginary line and in contact with the first curved part 303 may be defined as a third distance d3.

In other words, the third distance d3 may be understood as the distance between the second baffle insertion hole 314 positioned closest to the first curved part 303 among the second baffle insertion holes 314 and the first curved part 303.

A distance d2 between the fifth imaginary line in contact with the lower side of the third baffle insertion hole 316 and the first straight part 315 may be defined as a second distance d2.

A distance d4 between the second straight portions 307 and the sixth imaginary line perpendicular to the first imaginary line while being in contact with the right side of the second baffle inserting hole 314 located on the rightmost side with reference to FIG. 4 among the second baffle inserting holes 314 may be defined as a fourth distance d4.

In other words, the fourth distance d4 can be understood as the distance between the second baffle insertion hole 314 positioned closest to the second straight part 307 among the second baffle insertion holes 314 and the second straight part 307.

The first distance d1 may be longer than the second distance d2.

In other words, the flow area of the exhaust gas passing through the baffle 300 may increase by the difference in length between the first distance d1 and the second distance d2.

The third distance d3 may be longer than the fourth distance d4.

In other words, the flow area of the exhaust gas passing through the baffle 300 may increase by a difference in length between the third distance d3 and the fourth distance d4.

In addition, there is an effect that as the flow area of the exhaust gas increases, the pressure loss of the exhaust gas may be reduced and the heat transfer performance may increase.

Referring to FIG. 5, the plurality of baffles 300 may be arranged so that positions of the linear portions are different from each other. In other words, the plurality of baffles 300 may be arranged so that the positions of the first and second straight parts 305 and 307 are different from each other.

The plurality of baffles 300 may include a first baffle 320 and a second baffle 340 disposed to be rearwardly spaced apart from the first baffle 320.

The positions of the first and second straight parts 305 and 307 of the first baffle 320 may be different from those of the first and second straight parts 305 and 307 of the second baffle 340 in the first direction.

For example, the first straight part 305 and the second straight part 307 of the first baffle 320 may overlap the first curved part 303 of the second baffle 340 in the first direction.

In addition, the second curved part 309 positioned between the first straight part 305 and the second straight part 307 of the first baffle 320 may overlap the first curved part 303 in the first direction.

In detail, as illustrated in FIG. 5, the first straight part 305 and the second straight part 307 of the first baffle 320 are located on the upper side and the left side, respectively, in the first direction, and the first straight part 305 and the second straight part 307 of the second baffle 340 may be located on the lower side and the right side, respectively.

The vertical arrangement of the first, second, and third baffle insertion holes 312, 314 and 316 of the first baffle 320 may be opposite to the vertical arrangement of the first, second, and third baffle insertion holes 312, 314 and 316 of the second baffle 340.

For example, the first baffle insertion hole 312 and the third baffle insertion hole 316 of the first baffle 320 may be aligned with the third baffle insertion hole 316 and the first baffle insertion hole 316 of the second baffle 340 in the first direction, respectively.

The first baffle 320 and the second baffle 340 may be alternately arranged.

In detail, in the first direction, the first baffle 320, the second baffle 340, and the first baffle 320 may be arranged in order.

As described above, the first and second straight parts 305 and 307 of the second baffle 340 may overlap the first curved parts 303 of the first baffle 320 that are spaced rearwardly from the second baffle 340 in the first direction.

In addition, the second curved part 309 disposed between the first and second straight parts 305 and 307 of the second baffle 340 may overlap the first curved part 303 of a first baffle 320 spaced rearward from the second baffle 340 in the first direction.

In addition, the first baffle insertion hole 312 and the third baffle insertion hole 316 of the first baffle 320, which are alternately arranged, may be aligned with the third baffle insertion hole 316 and the first baffle insertion hole 316 of the second baffle 340, respectively.

If the first baffles 320 are sequentially arranged, since the exhaust gas flows in a straight line through the first straight part 305 or the second straight part 307 of the first baffle 320 overlapping in the first direction, there is a problem that the flow distance of the exhaust gas is shortened.

On the other hand, if the first baffle 320 and the second baffle 340 are alternately arranged, the exhaust gas flowing into the gas inflow pipe 130 flows through the upper side or the left side of the first baffle 320 and then flows through the lower side or the right side of the second baffle 340. In other words, the flow distance of the exhaust gas may increase by the arrangement of the first and second baffles 320 and 340.

Due to the arrangement of the first and second baffles 320 and 340, when the flow distance of the exhaust gas increases, the flow time of the exhaust gas increases, so that heat exchange performance between the exhaust gas and the cooling water can be improved.

In addition, the baffle 300 positioned most forward among the plurality of baffles 300 may be the first baffle 320. In this case, the gas inflow pipe 130 may be located closest to the first straight part 303 of the first baffle 320.

Due to the disposition of the first baffle 320 and the gas inflow pipe 130, the exhaust gas flowing into the second space 106 prevents pressure loss and easily passes through the first baffle 320 to be capable of flowing.

Figure 6:
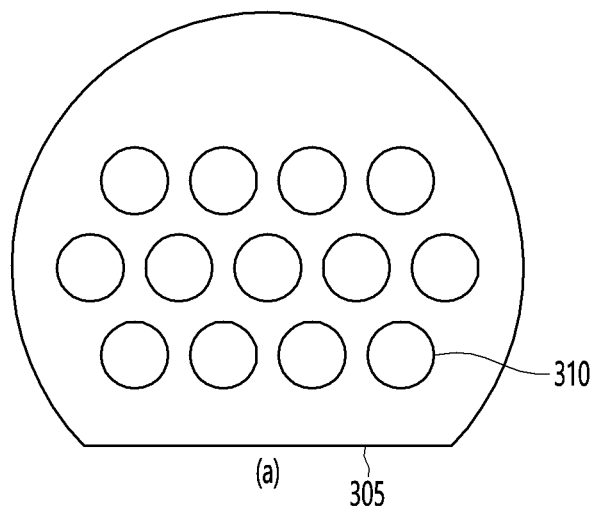
FIG. 6 is a front view illustrating the control group baffle and the baffle of the present disclosure for explaining the baffle of the present disclosure.
Figure 6:
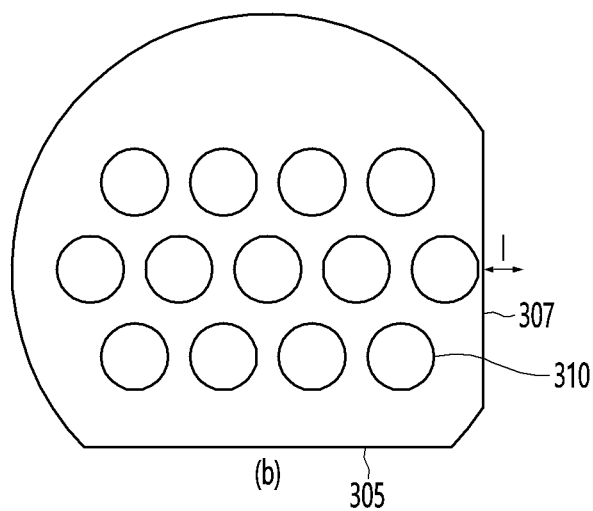

FIG. 6 is a front view illustrating the control group baffle and the baffle of the present disclosure for explaining the baffle of the present disclosure, and FIG. 7 is a table illustrating comparison results regarding the control group baffle and the baffle of the present disclosure.

Referring to FIGS. 6 and 7, the control group baffle (a) includes the first straight part 305 extending linearly, and the baffle (b) of the present disclosure may further include a second straight part 307 which extends linearly compared to the control group baffle (a).

In this case, the second straight part 307 may be formed in a direction crossing the first straight part 305 and may be formed by cutting a length by d from the control group baffle (a). The "d" may be defined as a "baffle cut length".

According to FIG. 7, since the control group baffle (a) and the baffle (b) of the present disclosure have the same diameter of the tube 200, the same number of the baffles 300, and the same number of the tubes 200, it can be understood the effect due to the second straight part 307.

With respect to the control group baffle (a) and the baffle (b) of the present disclosure, the diameter of the tube 200 to be inserted is 15 [mm], and the number of baffles 300 disposed in the heat exchanger 10 is 7 [pieces], the number of the tube 200 may be composed of 13 [pieces].

In the baffle (b) of the present disclosure, the baffle cut length (d) may be 9 [mm].

However, the baffle cut length d may vary according to the diameter of the tube 200 or the number of tubes 200.

According to the table of FIG. 7, the amount of heat [W] exchanged in the heat exchanger 10 in which the control group baffle (a) is installed is 6626.9 [W], and the amount of heat [W] exchanged in the heat exchanger 10 in which the baffle (b) of the present disclosure is installed is 6562.6 [W], and thus there is a difference which is about 1% but similar.

In contrast, it can be seen that the pressure [Pa] lost after the exhaust gas flowing into the heat exchanger 10 in which the control group baffle (a) is installed passes through the control group baffle (a) is 4870.5 [Pa] and the pressure [Pa] lost after the exhaust gas flowing into the heat exchanger 10 in which the baffle (b) of the present disclosure is installed passes through the baffle (b) of the present disclosure is 3605.5 [Pa].

In other words, compared to the control group baffle (a), the baffle (b) of the present disclosure can obtain the effect of reducing the exhaust gas pressure loss of about 26 [%].

In other words, compared with the control group baffle (a), when the baffle (b) of the present disclosure in which the second straight part 307 is formed is installed, since the pressure loss of the exhaust gas flowing into the heat exchanger 10 can be reduced, it is possible to increase the heat exchange efficiency.

Additionally, in the heat exchanger 10 of the present disclosure, by alternately arranging the first baffle 320 and the second baffle 340, the flow distance of the exhaust gas increases, thereby exhibiting the effect of additionally increasing heat exchange efficiency.

Hereinafter, the flow of exhaust gas and cooling water in the heat exchanger 10 in which the baffle 300 of the present disclosure is disposed in the order of the first baffle 320 and the second baffle 340 will be described.

Figure 8:
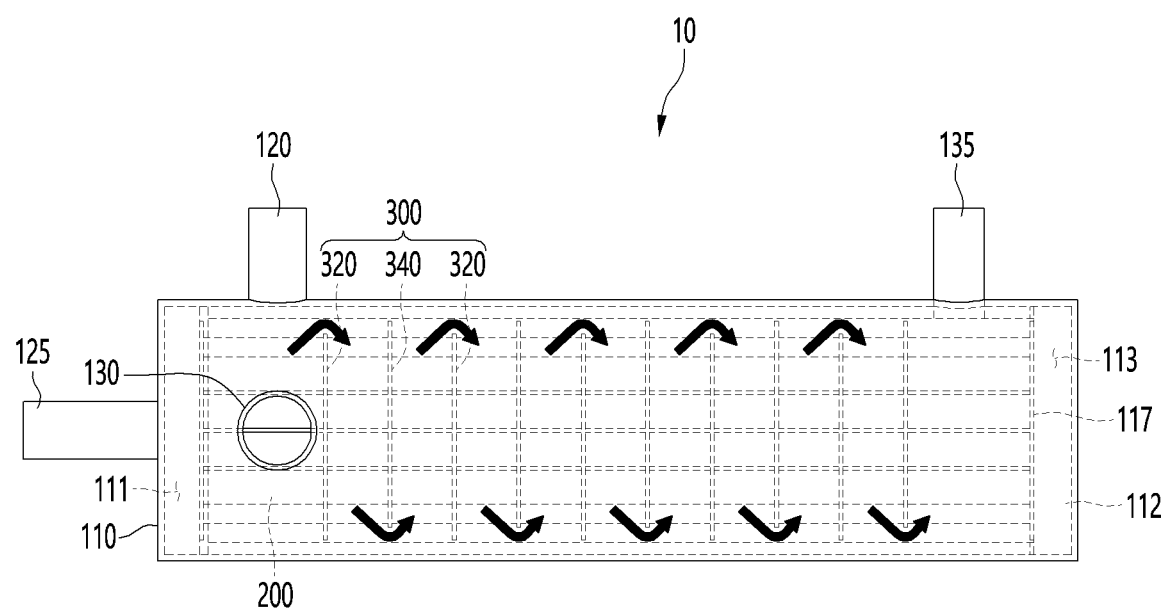
FIG. 8 is a view illustrating an exhaust gas flow of a heat exchanger according to an embodiment of the present disclosure.
Figure 9:
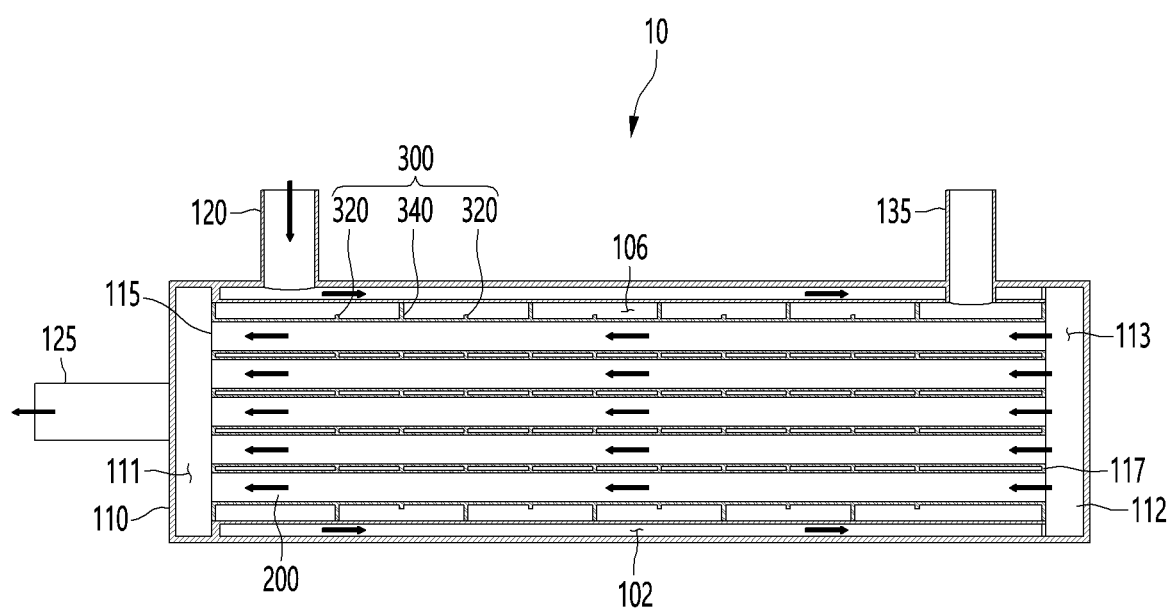
FIG. 9 is a view illustrating a flow of cooling water in the heat exchanger.

FIG. 8 is a view illustrating an exhaust gas flow of a heat exchanger according to an embodiment of the present disclosure and FIG. 9 is a view illustrating a flow of cooling water in the heat exchanger.

Referring to FIGS. 8 and 9, the exhaust gas flowing into the second housing 105 through the gas inflow pipe 130 flows between the tube 200 and the baffle 300 and may be discharged through the gas discharge pipe 135 after heat exchange with the cooling water flowing through the tube 200.

In detail, the exhaust gas can flow through a space between the plurality of tubes 200 or between the first straight part 305 and the second straight part 307 of the baffle 300 and the inner surface of the second housing 105.

In more detail, the exhaust gas flows through a space between the first straight part 305 formed on the upper side of the first baffle 320 and the inner surface of the second housing 105 or between the second straight part 307 formed on the left side of the first baffle 320 and the inner surface of the second housing 105.

After the exhaust gas passing through the first baffle 320 flows between the tubes 200 positioned between the first baffle 320 and the second baffle 340, the exhaust gas may flow a space between the first straight part 305 formed on the lower side of the second baffle 340 and the inner surface of the second housing 105 or between the second straight part 307 positioned on the right side of the second baffle 340 and the inner surface of the second housing 105.

Likewise, the exhaust gas passing through the second baffle 340 may repeat a process of passing through the first baffle 320.

Since the flow distance of the exhaust gas repeatedly passing through the first baffle 320 and the second baffle 340 increases due to different positions of the first and second straight parts 305 and 307 of the first baffle 320 and the second baffle 340, it may take a long time for the exhaust gas to exchange heat with the cooling water flowing through the tube 200. In other words, the amount of heat exchange between the cooling water and the exhaust gas may increase, and heat exchange performance may be improved.

The cooling water flowing through the cooling water inflow pipe 120 may flow in the first space 102 of the first housing 101.

The cooling water flows through the cooling water inflow pipe 120 and flows in the first direction.

At this time, the cooling water flowing into the first space 102 may be prevented from flowing into the first cover space 111 by the one cover 110.

In addition, since the first space 102 is a space between the first housing 101 and the second housing 105, the cooling water flows in the first direction while spreading in the circumferential direction.

The cooling water flowing through the first space 102 flows into the second cover space 113 of the other cover 112 close to the gas discharge pipe 135, and then may be distributed and flows into the plurality of tubes 200 through the header insertion hole 117a of the header 117 adjacent to the other cover 112.

The cooling water flows therein through one end of the tube 200 connected to the header insertion hole 117a of the other header 117.

The cooling water flowing into the plurality of tubes 200 flows inside the tube 200 toward the front which is opposite to the first direction and can be exchanged with exhaust gas flowing through the second space 106 in the process. At this time, since the cooling water absorbs heat contained in the exhaust gas, the temperature thereof increases.

The cooling water flowing through the plurality of tubes 200 may flow into the first cover space 111 through the header insertion hole 115a of the one header 115 connected to the other end of the tube 200.

The cooling water flowing into the first cover space 111 may flow out through the cooling water outflow pipe 125 connected to the one cover 110.

In the embodiment of the present disclosure, it has been described that the first baffle 320 is disposed before the second baffle 340 is disposed, but the second baffle 340 may be disposed before the first baffle 320 is disposed.

In addition, although it has been described that one cover 110 and the other cover 112 are provided in the embodiment of the present disclosure, only one side of the first housing 101 is opened and thus one cover 110 which is coupled to the opening may be provided.

In addition, in the embodiment of the present disclosure, it has been described that a pair of covers 110 and 112 are provided separately from the housing 100, but the covers 110 and 112 and the housing 100 may be integrally formed.

The invention claimed is:

1. A heat exchanger comprising:
   a housing including a first housing and a second housing and a first space through which a cooling water flows is formed between the first housing and the second housing;
   a gas inflow pipe configured to flow exhaust gas into the housing and a gas exhaust pipe configured to discharge the exhaust gas to the outside of the housing;
   a cooling water inflow pipe configured to flow cooling water into the housing and a cooling water outflow pipe configured to flow out the cooling water heat-exchanged with the exhaust gas to the outside of the housing;
   a plurality of tubes extending in the housing in a longitudinal direction of the housing and through which the cooling water flowing therein through the cooling water inflow pipe flows; and
   a plurality of baffles installed in the housing and into which the plurality of tubes are inserted, the plurality of baffles being spaced apart from each other by a predetermined distance, wherein the baffle comprises:
      a first curved part configured to extend to be rounded with a first curvature,
      a first straight part configured to extend linearly from an end of the first curved part,
      a second straight part configured to extend linearly from the other end of the first curved part, and
      a second curved part positioned between the first and second straight parts and configured to extend to be rounded with a second curvature, and
   wherein the first straight part and the second straight part are formed in a direction crossing each other,
   wherein the first and second housings have cylindrical shapes with both sides open and further includes:
      a pair of headers coupled to both sides of the second housing and having a plurality of header insertion holes into which the plurality of tubes are inserted, and
      a pair of covers disposed on outside of the pair of headers and coupled to both sides of the first housing, and
      wherein a cover space is formed that is integrally open and communicates with the tube and the first space without being divided, is formed in a cover located at a rear of the pair of covers and configured to allow a flow direction of the cooling water flowing through the first space to change.

2. The heat exchanger of claim 1, wherein the first curvature and the second curvature are the same.

3. The heat exchanger of claim 2, wherein the plurality of baffles are disposed to be spaced apart from each other in an extension direction of the tube, wherein the plurality of baffles include a first baffle and a second baffle spaced apart from the first baffle, and wherein the first straight part and the second straight part of the first baffle overlap the first curved part of the second baffle in an extension direction of the tube.

4. The heat exchanger of claim 3, wherein, in the plurality of baffles, the first baffle and the second baffle are alternately arranged.

5. The heat exchanger of claim 4, wherein the first straight part and the second straight part of the second baffle overlap the first curved part of the first baffle adjacent to the second baffle in the extension direction of the tube.

6. The heat exchanger of claim 3, wherein a plurality of baffle insertion holes into which the plurality of tubes are inserted are formed in the baffle.

7. The heat exchanger of claim 6, wherein a length of the first straight part is longer than a length of the second straight part, wherein the plurality of baffle insertion holes are parallel to the first straight part and are arranged to form a plurality of rows, and wherein a number of the baffle insertion holes adjacent to the first straight part is greater than a number of the baffle insertion holes adjacent to the second straight part.

8. The heat exchanger of claim 7, wherein the plurality of baffle insertion holes includes:
   a first baffle insertion hole forming a first row and disposed furthest from the first straight part, a second baffle insertion hole forming a second row, and a third baffle insertion hole forming a third row and disposed closest to the first straight part.

9. The heat exchanger of claim 8, wherein a distance between a second baffle insertion hole of the second baffle insertion holes, which is located closest to the first curved part and the first curved part is greater than a distance between a second baffle insertion hole of the second baffle insertion holes, which is located closest to the second straight part and the second straight part.

10. The heat exchanger of claim 8, wherein a number of the first baffle insertion holes is the same as a number of the third baffle insertion holes.

11. The heat exchanger of claim 10, wherein the first baffle insertion hole of the first baffle is aligned with the third baffle insertion hole of the second baffle, and wherein the third baffle insertion hole of the first baffle is aligned with the first baffle insertion hole of the second baffle.

12. The heat exchanger of claim 6,
wherein the cooling water inflow pipe is connected to the first housing, and wherein the gas inflow pipe is formed through the first housing and connected to the second housing.

13. The heat exchanger of claim 12, wherein a length of the housing is a distance from a front end part to a rear end part of both end parts of the housing, wherein the gas inflow pipe is located closer to the front end part of both end parts of the first and second housings, wherein the gas discharge pipe is located closer to the rear end part of both end parts of the first and second housings, wherein the extension direction of the tube is from a front to a rear, and wherein the gas inflow pipe is positioned close to the first straight part of the first baffle.

14. The heat exchanger of claim 1, wherein a baffle insertion hole is aligned with a header insertion hole in a rear direction.

15. The heat exchanger of claim 14, wherein the cooling water inflow pipe is arranged such that the cooling water flowing in through the cooling water inflow pipe flows through the first space and thus the direction thereof is changed in the cover space and flows into the plurality of tubes, and wherein the gas inflow pipe is arranged such that the exhaust gas flowing in through the gas inflow pipe flows from a front to a rear in an inner space of the second housing and is discharged to the gas discharge pipe.

* * * * *